(12) United States Patent
Weaver

(10) Patent No.: US 6,318,018 B1
(45) Date of Patent: Nov. 20, 2001

(54) FISHING ROD HOLDING DEVICE INCORPORATING RAPID RELEASE CONSTRUCTION

(76) Inventor: Damon Weaver, 25110 Terra, Chesterfield, MI (US) 48051

( * ) Notice: Subject to any disclaimer, the term of this patent is extended or adjusted under 35 U.S.C. 154(b) by 0 days.

(21) Appl. No.: 09/503,410

(22) Filed: Feb. 14, 2000

(51) Int. Cl.$^7$ .................................................. A01K 97/10
(52) U.S. Cl. ............................................... 43/21.2
(58) Field of Search .......................... 43/21.2; 248/511, 248/514, 518, 316.5

(56) References Cited

U.S. PATENT DOCUMENTS

| | | | |
|---|---|---|---|
| D. 202,353 | * 9/1965 | Wester | D31/4 |
| 760,598 | * 5/1904 | Wynegar | 248/316.5 |
| 977,835 | * 12/1910 | Piscator | 43/21.2 |
| 1,459,438 | * 6/1923 | Brand | 43/21.2 |
| 1,534,642 | * 4/1925 | Hoagland | 248/316.5 |
| 1,760,592 | * 5/1930 | Gift | 43/21.2 |
| 2,200,183 | * 5/1940 | Legg | 43/21.2 |
| 4,528,768 | 7/1985 | Anderson . | |
| 4,586,688 | 5/1986 | Hartman et al. . | |
| 4,831,763 | 5/1989 | Alcorn . | |
| 5,065,540 | 11/1991 | Potter, Jr. . | |
| 5,313,734 | 5/1994 | Roberts . | |
| 5,365,689 | * 11/1994 | Holliman | 43/21.2 |
| 6,089,524 | * 7/2000 | Lai | 248/535 |

* cited by examiner

Primary Examiner—Kurt Rowan
(74) Attorney, Agent, or Firm—Gifford, Krass, Groh, Sprinkle, Anderson & Citkowski, P.C.

(57) ABSTRACT

A holding device for use with a conventional fishing rod, the fishing rod including an elongate handle, a bendable shaft and a reel. The holding device includes an elongate body constructed from a first semi-cylindrical shaped halve and a second semi-cylindrical shaped halve. Each of the first and second halves further includes an open top end and a closed bottom end and defines, upon aligning the first and second halves in opposing and interengaging fashion, an elongate and interiorly extending passage for receiving in inserting manner the fishing rod handle. The first and second halves are pivotally connected to each other along the bottom ends. A trigger is pivotally secured to the second semi-cylindrical shaped halve and terminating in first and second arcuately extending latch arms for releasably interengaging the first semi-cylindrical halve together with the second semi-cylindrical halve in a first closed position. The trigger and latch mechanism disengages the first semi-cylindrical half from the second semi-cylindrical half upon being pivoted to a second open position and reveals the inserted end of the fishing rod handle. A mounting assembly is provided upon which the elongated holding device body is secured and for affixing the holding device, and the fishing rod and handle, to a desired location. The mounting assembly in one embodiment is provided by a twist-fitting ground stake and in a further embodiment by a deck mount with first and second axial repositioning.

18 Claims, 7 Drawing Sheets

FISHING ROD HOLDING DEVICE INCORPORATING RAPID RELEASE CONSTRUCTION

BACKGROUND OF THE INVENTION

1. Field of the Invention

The present invention relates generally to fishing rod clamping and holding devices and, more particularly, to such a holding device incorporating an integrally formed and rapid release construction which is capable of securely gripping and retaining a conventional elongate rod portion of a fishing rod in a first closed position and which is further capable of being quickly actuated to an open position so that the rod may be easily removed from the holding device, such as during pulling and reeling in of a fish which has grabbed the fishing line.

2. Description of the Prior Art

The prior art is well documented with fishing rod holding and clamping devices for use with casting and spinning reels. One example is illustrated in U.S. Pat. No. 5,313,734, issued to Roberts, and which discloses such a fishing rod holder including a holster portion for receiving a rod and a flexible clamp rotatably mounted in a recess on one end of the holster for retaining a reel within the holster. The flexible clamp is discontinuous with an opening less than the diameter of the circumferential slot whereby the opening must be widened by flexing the clamp when assembling the clamp in the recess. The holster further includes support flanges extending therefrom and straddling the recess for supporting the clamp in the recess and for providing stops to the rotation of the clamp when locking a rod in the holster or when releasing the rod from the holster.

U.S. Pat. No. 4,528,768, issued to Anderson, teaches a fishing rod holder with a mounting bracket securable to a structural member of a boat, a tubular body member having open ends for receiving a rod handle inserted through one end and having a slot longitudinally disposed in one side. The tubular body is mounted to the bracket and a lever block is mounted for limited pivotal movement with respect to the tubular member and carrying therethrough a threaded rod having a handle and a camming head with the camming head and the end of the rod projecting into the body member slot. A tongue member having a generally semicircular cross section is disposed inside the body member and meeting and fastened at one end to the interior of the body member and covering the slot. The rod drives the camming head into deflecting engagement with the free end of the tongue to deflect the tongue toward the interior of the body member and into locking engagement with a fishing rod handle when the lever block is in the locked position. Upon rotating the lever block to the open position, the camming head is rotated out of engagement with the tongue member and into the slot for releasing the engaging pressure applied to the rod handle.

U.S. Pat. No. 4,831,763, issued to Alcorn, discloses a fishing rod holder for receiving the handle of a fishing rod and including a container having a plate which applies pressure to the rod handle. The container is pivotally attached to a base and by pivoting the container in one direction, pressure is applied to the handle and when the container is pivoted in the opposite direction, the plate withdraws from the rod handle to allow the user to extract the rod from the holder.

U.S. Pat. No. 5,065,540, issued to Potter, Jr. discloses a striking rod holder for mounting to a boat, fishing chair or rocket launcher. The rod holder includes a first plate, a rod holding tube attached to the first plate, and a second plate for attaching to a surface where the first plate pivotally attaches to the second plate. A cushion material is positioned between the first plate and the second plate and a locking device may be employed for maintaining the tube in a fixed position.

Finally, U.S. Pat. No. 4,586,688, issued to Hartman et al., teaches a yet further variation of a fishing rod holder including a receptacle and cover member pivotably connected to each other and movable about a pivot axis between open and closed positions. The pivot axis is established along the respective lengths of the receptacle and cover member halves to be co-linear with the axially extending direction of a portion of the fishing rod shaft which is gripped therebetween, and as opposed to gripping the fishing rod by its handle.

SUMMARY OF THE PRESENT INVENTION

The present invention is a holding device for use with a conventional fishing rod which is an improvement over the prior art in that it provides a simplified, yet more durable alternative to the prior rod holding devices and is further adaptable to both sea and land applications.

The holding device includes an elongate body constructed from first and second elongate and polygonal cross sectional shaped halves, each of which further include an open top end and a bottom end and which define, upon aligning the first and second halves in opposing and interengaging fashion, an elongate and interiorly extending passage for receiving in inserting manner the fishing rod handle. The first and second halves are pivotally connected to each other along the bottom ends such that the second semi-cylindrical halve will be caused to pivot outwardly relative to the first likewise shaped halve.

A trigger is further pivotally secured to the second semi-cylindrical shaped halve in a position proximate to its open top end. The trigger includes first and second oppositely extending and arcuate shaped latch arms which extend around the cross section of the second body halve and terminate in downwardly angled tabs proximate to the first semi-cylindrical shaped halve. The first semi-cylindrical body halve further includes first and second outwardly extending ledges arrayed in abuttingly engaging alignment with the downwardly angled tabs upon the trigger being pivotally actuated in a selected direction and for releasably interengaging the first semi-cylindrical halve together with the second semi-cylindrical halve. The trigger disengages the first semi-cylindrical half from the second semi-cylindrical half upon being pivoted to a further selected and opposite direction and reveals the inserted end of the fishing rod handle for removal from the holding device.

The trigger in the preferred embodiment further includes a central portion from which the first and second arcuate latch arms extend, as well as an upwardly extending and annular shaped collar which is seatingly aligned with a corresponding upper annular edge of the second semi-cylindrical shaped portion upon the first and second halves being pivoted together and the trigger actuated to the closed position. In a further embodiment, a safety switch is incorporated into the trigger to prevent inadvertent opening of the device, due to such instances as the fishing line snapping and the pole bending backwards and acting upon the trigger. The safety switch embodiment contemplates a slot formed through the second semi-cylindrical shaped halve which is positioned in proximity to a downwardly extending finger portion of the trigger. A switch plate of lesser dimension than the slot is mounted within the slot, the switch plate being translatable from a first location in which it abuts against the finger portion to a second location in which it is slidably translated out of contact with the finger portion, the switch plate preventing the unauthorized pivotal engagement of the trigger when in the first closed position. An end cap is also be biasingly affixed over the first and second open top ends of the elongate body in the closed position.

A mounting assembly is provided upon which the elongate holding body is secured and operates to secure the holding device to a desired location. The mounting assembly according to a first embodiment includes an elongate ground stake having a first mounting end and a second turf engaging and spike shaped end. Twist-fit engagement structure is provided between the mounting end of the ground stake and the holding body and includes a first arcuate and semi-circular shaped ledge projection extending from a top edge surface of the first mounting and a second arcuate and semi-circular shaped ledge projection extending from the first mounting end a downwardly spaced distance and in a direction opposite from the first ledge.

The first semi-cylindrical shaped body halve of the holding device further has defined, upon an inner and correspondingly semi-cylindrical shaped surface of the halve, a projecting shoulder. The shoulder includes first and second enlarged projections which are separated by a semicircular and reduced projection, the shoulder further defines upper and lower edge surfaces which are substantially spaced apart equal to the distance established between the first and second ledge projections of the ground stake. An aperture is formed through the closed bottom end of the first semi-cylindrical shaped halve for insertion of the mounting end of the ground stake. Upon the mounting end of the ground stake being inserted within said aperture, the stake is rotated a determined angular increment so that the first arcuate ledge projection engages upon an upper edge surface of a first selected enlarged shoulder portion, the second arcuate ledge projection engages upon a lower edge surface of a second selected enlarged shoulder portion. The spike end of the stake may then be embedded within the ground or turf to securely position the device on land.

The mounting assembly according to a further preferred embodiment further includes a deck mount for securing said elongate body to a substantially level surface. The deck mount may further include either one of a horizontally mounted or vertically mounted plate which also includes a plurality of apertures for receiving mounting fasteners and for securing the plate to a corresponding horizontal or vertical level surface.

The deck mount variant further provides the aspect of permitting repositioning of the holding device and includes a first linkage member having a downwardly extending pedestal support which is engageably received within a receptacle formed in the deck mount. The pedestal support permits the linkage member to be pivoted about a first axis extending linearly along the pedestal support, the first linkage member further terminates at an upper end in a first circular shaped head portion which displays a first interengaging circular face upon which are formed a first annular array of serrated portions. A key-shaped aperture extends through a central location of the first circular shaped head portion.

A second linkage member is provided having an elongate mounting portion extending therefrom and which secures to an exterior facing surface of the first semi-cylindrical shaped halve. The second linkage member further includes a second circular shaped head portion which displays a second interengaging circular face upon which are formed a second annular array of serrated portions. A further key-shaped aperture extends through a central location of the second circular shaped head portion, the first and second annular arrays of serrated portions of the first and second circular linkage members being aligned in opposing and engaged fashion and so that the first and second key-shaped apertures are in alignment.

A key is provided having an elongate stem and a knob secured to one end thereof, the stem being insertingly engaging through the first and second aligned key-shaped apertures. The knob is then rotated in a selected direction to tighten the first and second circular shaped head portions of the linkage members and to permit the second linkage member and the elongate body to pivot about a second axis extending through a center line established with the first circular shaped head portion of the first linkage member.

BRIEF DESCRIPTION OF THE DRAWINGS

Reference will now be made to the attached drawings, forming a part of the following detailed description, wherein like reference numerals refer to like parts throughout the several views, and in which.

DETAILED DESCRIPTION OF THE PREFERRED EMBODIMENTS

Figures 1, 2:
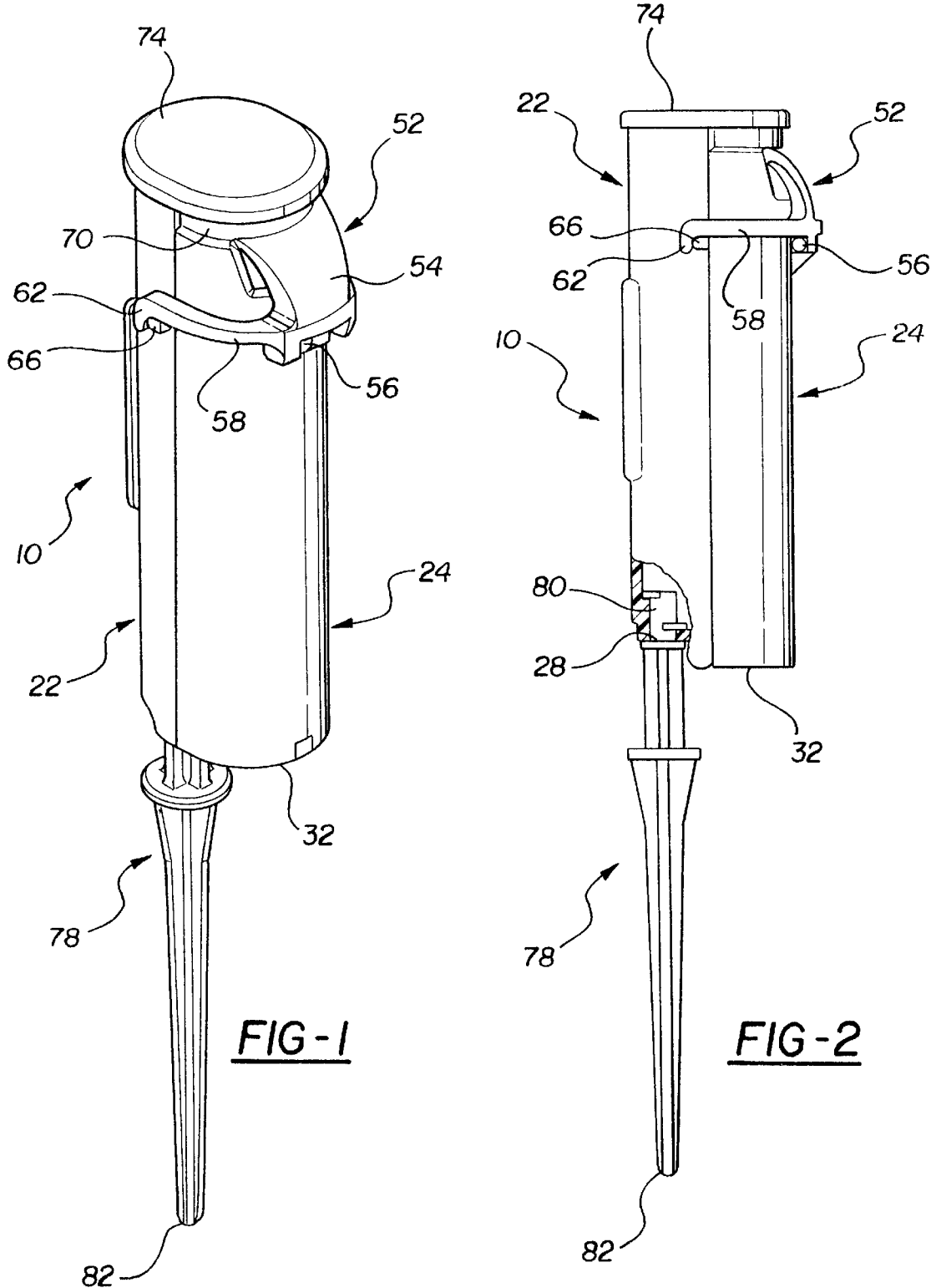
FIG. 1 is a perspective view of the fishing rod holder according to a first preferred embodiment of the present invention.
FIG. 2 is a side view of the fishing rod holder as illustrated in FIG. 1 and further showing in further detail and interior cutaway the twist fitting interengagement of the elongate ground stake with the likewise elongate receiving body according to the present invention.

Referring now to FIG. 1, a perspective view is illustrated at 10 of a fishing rod holder according to a first preferred embodiment of the present invention. The fishing rod holder is illustrated at 12 in FIG. 4 and includes an elongate handle 14, a bendable shaft 16 and a reel 18 secured to the handle. The reel 18 issues a fishing line 20 extending in proximity along the shaft 16 and beyond a remote end of the shaft 16 (not shown). The fishing line 20 terminates in a fish baiting portion (also not shown).

Figure 3:
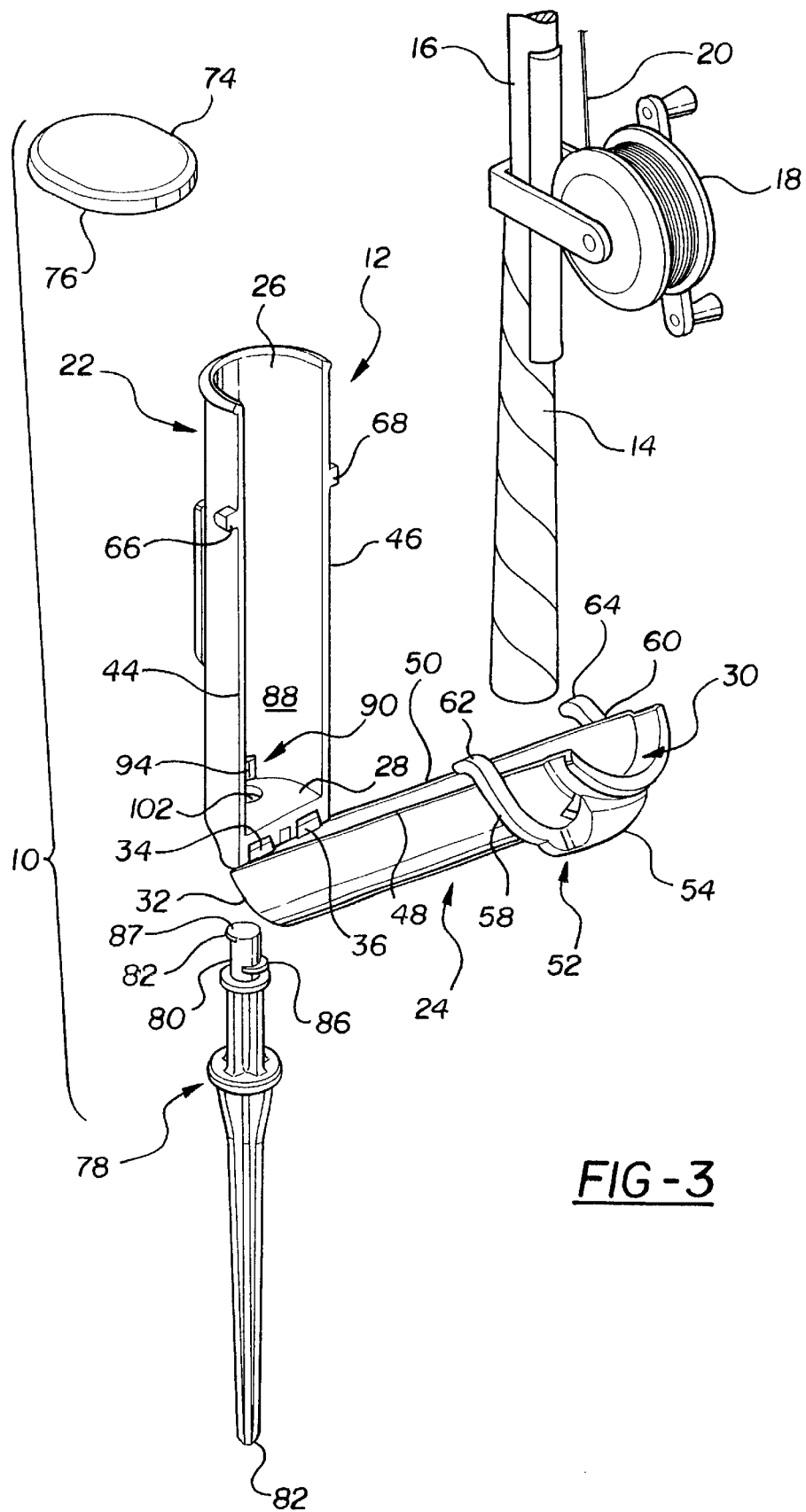
FIG. 3 is an exploded view of the fishing rod holder illustrated in FIGS. 1 and 2 and showing in more detail the pivotally associated aspect of the first and second semi-cylindrical halves.

Referring again to FIG. 1, as well as to the side profile view of FIG. 2 and the exploded view of FIG. 3, the holding device 10 further includes an elongate body constructed from a first polygonal cross sectional shaped halve 22 and a second likewise polygonal cross sectional shaped halve 24. The holding device is constructed of any suitable durable material, but is preferably a high grade and impact-resistant plastic. It is further contemplated that the cross sectional configuration of each of the elongated body halves 22 and 24 can be of any polygonal shape with any number of sides, extending up to an infinite number of sides which defines a semi-cylindrical or oval shape and without departing from the scope of the present invention. In the preferred embodiment, the first and second elongate halves are defined as first and second semi-cylindrical shaped halves and will be discussed as thus for the balance of this detailed description.

The first semi-cylindrical shaped halve 22 includes an open top end 26 and a closed bottom end 28 (see FIG. 3). The second semi-cylindrical shaped halve 24 likewise includes an open top end 30 and a closed bottom end 32 and, upon aligning of the first and second halves 22 and 24 in opposing and interengaging fashion, an elongate and interiorly extending passage is defined between the closed halves 22 and 24 for receiving in inserting manner the fishing rod handle 14. The first and second halves 22 and 24 are pivotally connected to each other along the bottom ends 28 and 32, respectively, and this further includes (referring to the partial view of FIG. 4) spaced apart hinge portions 34 and 36 which extend from the bottom end 32 of the second halve 24.

Additional spaced apart and aligning portions 38, 40 and 42 extend from the corresponding bottom end 28 of the first halve 22 and interengage in alternating and aligning fashion with the spaced apart hinge portions 34 and 36 of the second halve 24. The aligning portions 34 and 36 and 38, 40 and 42 may interference fit together or, alternatively, a pin may be inserted through the aligning portions to pivotally secure the first and second elongated halves 22 and 24 together.

To further assist in the flush fitting of the first and second halves 22 and 24, it is also contemplated that a first pair of mating and elongate extending recesses (see at 44 and 46) may extend axially and along the opposite and mating sides of the first halve 22. A second pair of mating and elongate extending projections 48 and 50 extend in a likewise axially extending direction along the opposite and mating sides of the second halve 24.

A trigger assembly 52 is pivotally secured to the second semi-cylindrical shaped halve 24 and is employed to releasably interengage the first semi-cylindrical halve 22 together with the second semi-cylindrical halve 24 in the closed position. The trigger assembly 52 is actuated to disengage the first semi-cylindrical half from the second semi-cylindrical half upon being pivoted to a second open position and in order to reveal the inserted end of the fishing rod handle 14.

The trigger assembly 52 includes a central portion 54 which is pivotally mounted, by virtue of an interengaging pin and recess arrangement 56, to the second semi-cylindrical shaped halve 24 in a position proximate to its open top end 30. Any other suitable arrangement may also be employed for permanently affixing the trigger assembly 52 to the second body halve 24, such as again through the use of alternating and spaced apart mounting portions. In any event, it is an objective of the invention to provide the trigger assembly 24 as a permanent and integral part of the main body portion of the holding device and is an improvement over the prior art in that holding device body is not separated into individual pieces during the opening and closing of the halves 22 and 24, thus eliminating the likelihood of losing individual pieces of the present device.

The trigger assembly 52 further includes a first 58 and a second 60 oppositely extending and arcuate shaped latch arm. Each of the latch arms 58 and 60 extend around the cross sectional (or semi-cylindrical) configuration of the second elongated halve 24 and terminate in downwardly angled tabs 62 and 64, respectively. The first semi-cylindrical shaped halve 22 further includes first and second outwardly extending ledges 66 and 68 arrayed in abuttingly engaging alignment with the downwardly angled tabs 62 and 64 upon the trigger assembly 52 being pivotally actuated to the closed position. An annular and semi-circular shaped collar 70 (see FIG. 4) extends from an upper end of said central portion 54 and seatingly aligns with a corresponding upper annular edge 72 of the second semi-cylindrical portion 24 (defining the open top end 30) and upon the trigger assembly 52 being pivoted to the closed position as is illustrated in some detail by the enhanced view of FIG. 5 and the direction of pivoting of the trigger assembly 52 about a specified axis and as is illustrated by the arrow 73. Also, an end cap 74 is provided and which includes a downwardly facing annular rim edge 76. The cap 74 is capable of being biasingly affixed over the corresponding continuous and mating rim defined by the first and second halves 22 and 24 in the closed position.

A mounting assembly is also provided forming a portion of the holding device 10 and for fixedly securing the holding device to a desired location. The mounting device according to the first preferred embodiment includes an elongate ground stake 78 having a first mounting end 80 and a second turf engaging and spike shaped end 82.

Twist-fit engaging structure is provided between the mounting end 80 of the ground stake 78 and the elongated holding device body constructed by the first and second halves 22 and 24. The twist-fit engaging structure further includes a first arcuate and semi-circular shaped ledge projection 82 extending from a top edge surface 84 of the first mounting end 80 of the ground stake 78 (see exploded view of FIG. 3). A second arcuate and semi-circular shaped ledge projection 86 extends from the first mounting end 80 a downwardly spaced distance from the first ledge projection 82 and in a direction opposite said first ledge projection 82.

Figure 4:
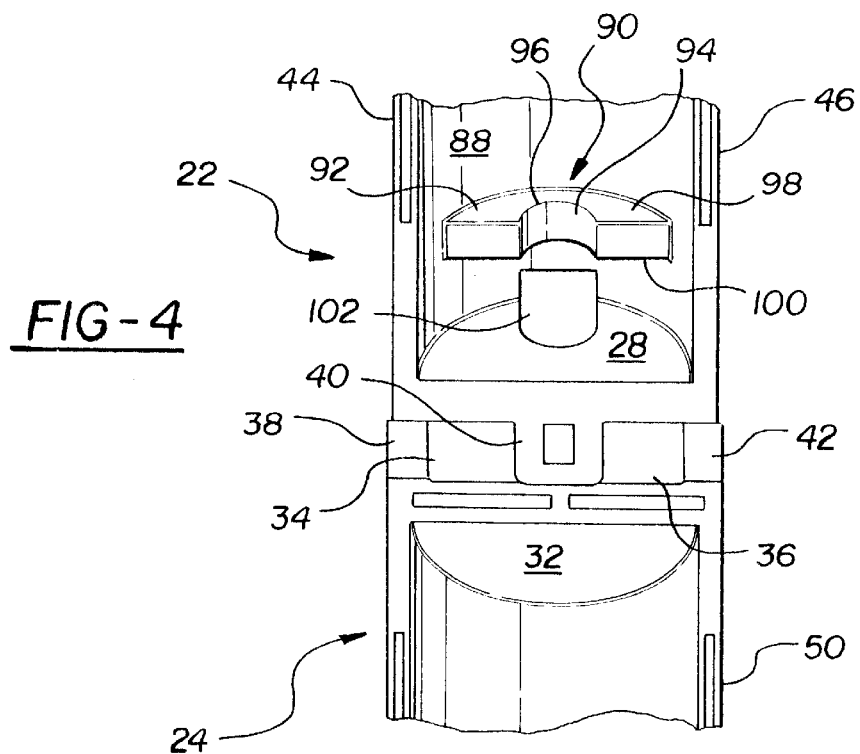
FIG. 4 is an enlarged partial view of the base portions of the first and second engaging and semi-cylindrical halves and illustrating in additional detail the reception structure formed within the first engaging half for securing the ground stake.
Figure 5:
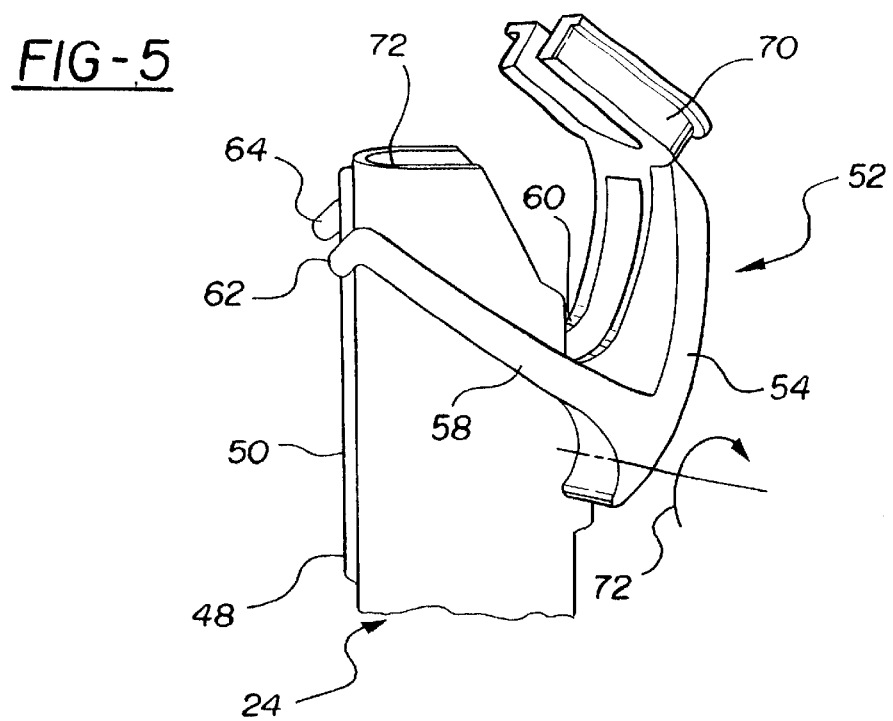
FIG. 5 is a further enlarged partial view which shows the pivotally mounted trigger for releasably securing the first and second semicylindrical halves together.

The first semi-cylindrical shaped body halve 22 of said holding device 10 further has defined, upon an inner and correspondingly semi-cylindrical shaped surface 88 of the halve 22 a projecting shoulder 90 (and as is further best illustrated in FIGS. 3 and 4). The shoulder 90 includes first and second enlarged projections 92 and 94 which are separated by a semicircular and reduced projection 96. The shoulder 90 further defines upper and lower edge surfaces 98 and 100 which are substantially spaced apart and equal to the distance established between the first and second ledge projections 82 and 86 of the ground stake 78. An aperture 102 is formed through the closed bottom end 28 of the first semi-cylindrical shaped halve 22 for insertion of the first mounting end 80 of the ground stake 78.

Upon engaging the mounting end of the ground stake 78 within the aperture 102, the stake 78 is then rotated a determined angular increment so that the first arcuate ledge projection 82 engages upon an upper edge surface 98 of a first selected one of the enlarged shoulder projections 92 and 94, said second arcuate ledge projection 86 engaging upon a lower edge surface 100 of a second selected one of the enlarged shoulder projections 92 and 94. In this manner, the ground stake 78 is fixedly secured to the holding device body and may be embedded into a ground turf location (not shown).

Figure 6:
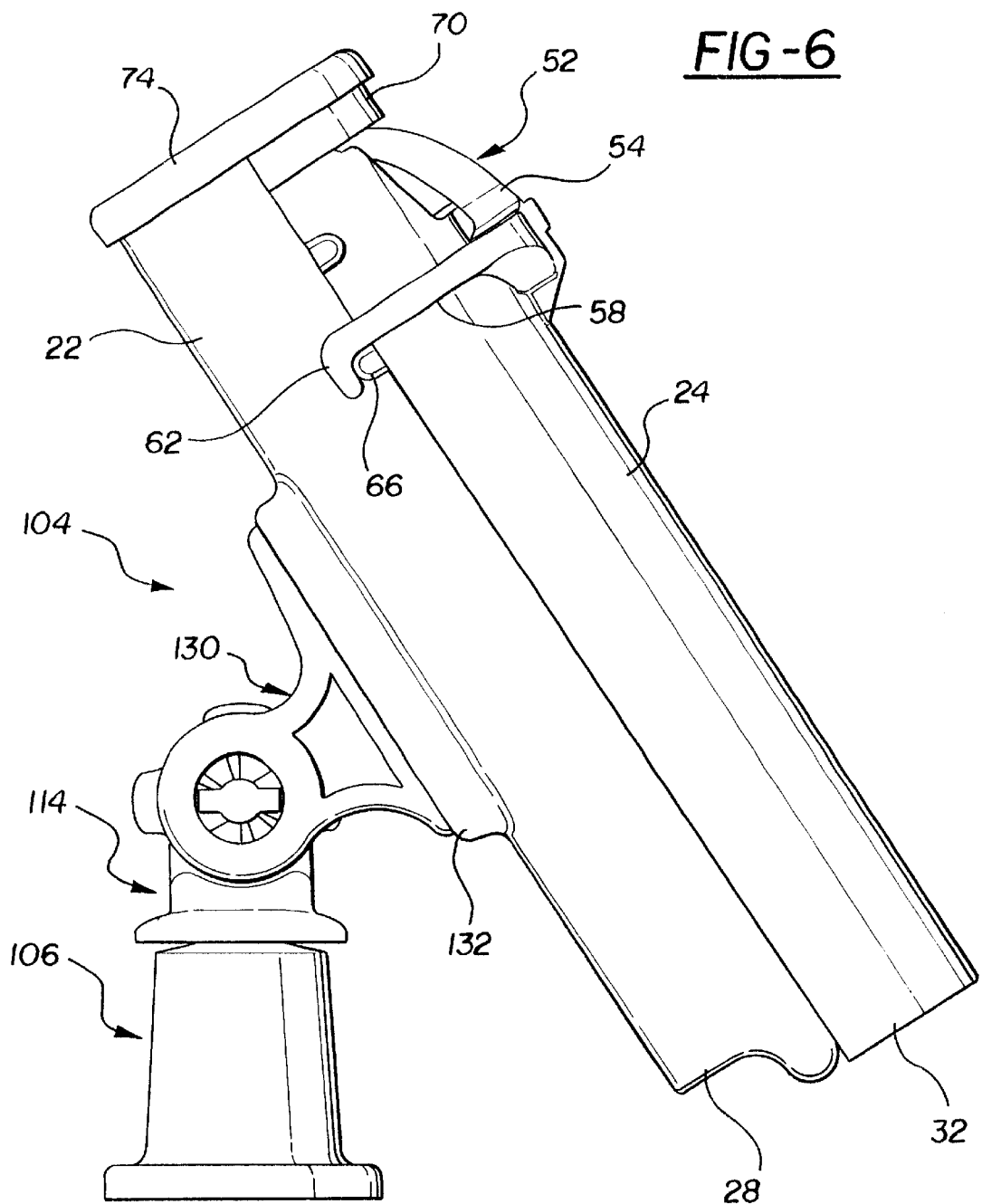
FIG. 6 is a plan view of the fishing rod holder according to a second preferred embodiment of the present invention and illustrating a deck mount for securing the fishing rod to a horizontal level surface in a repositionable manner along both horizontal and vertical axes.
Figure 7:
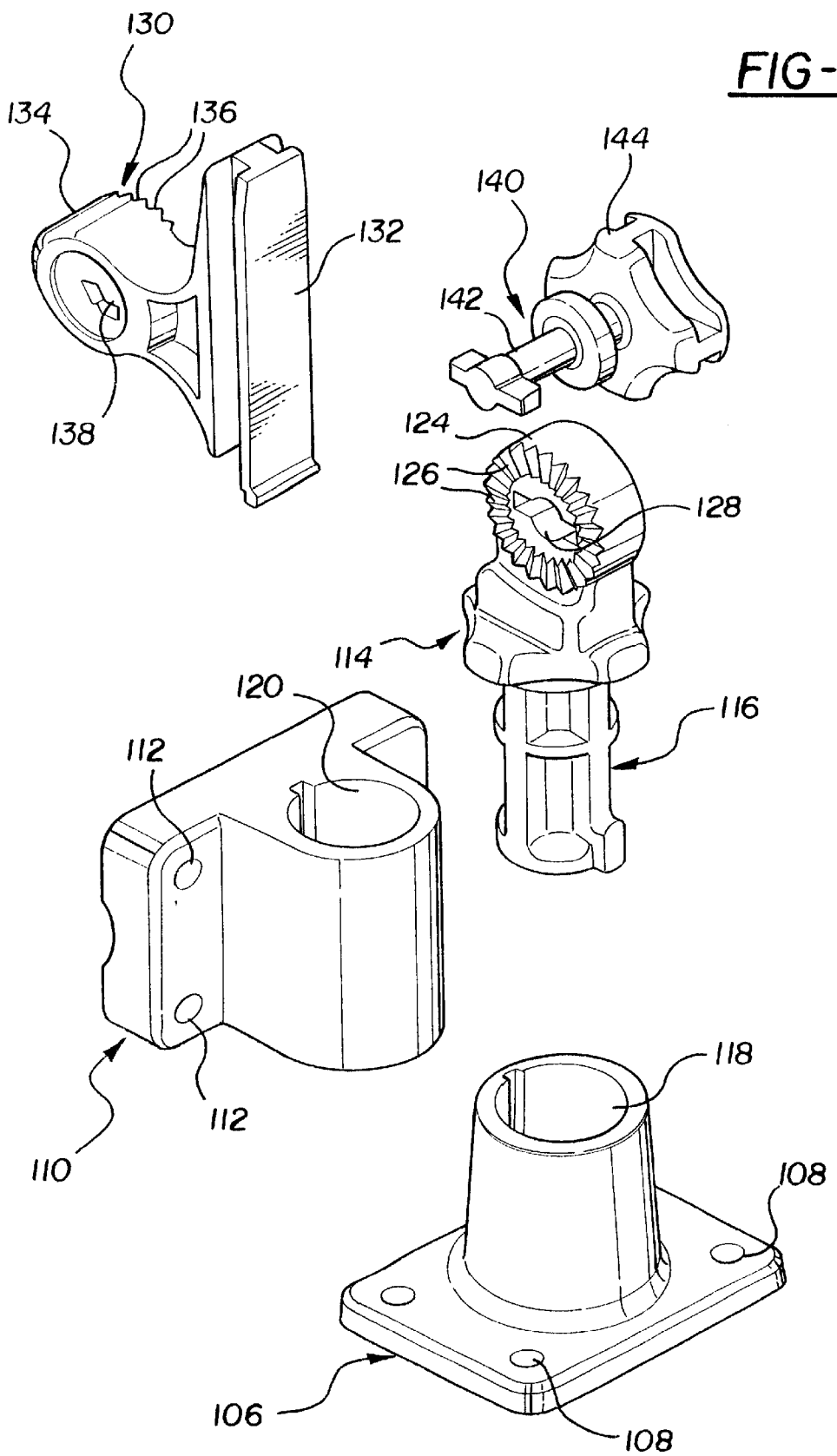
FIG. 7 is an exploded view of the mounting structure illustrated in FIG. 6 and further showing, in the alternative, an optional mount for engaging with a vertical surface.
Figure 8:
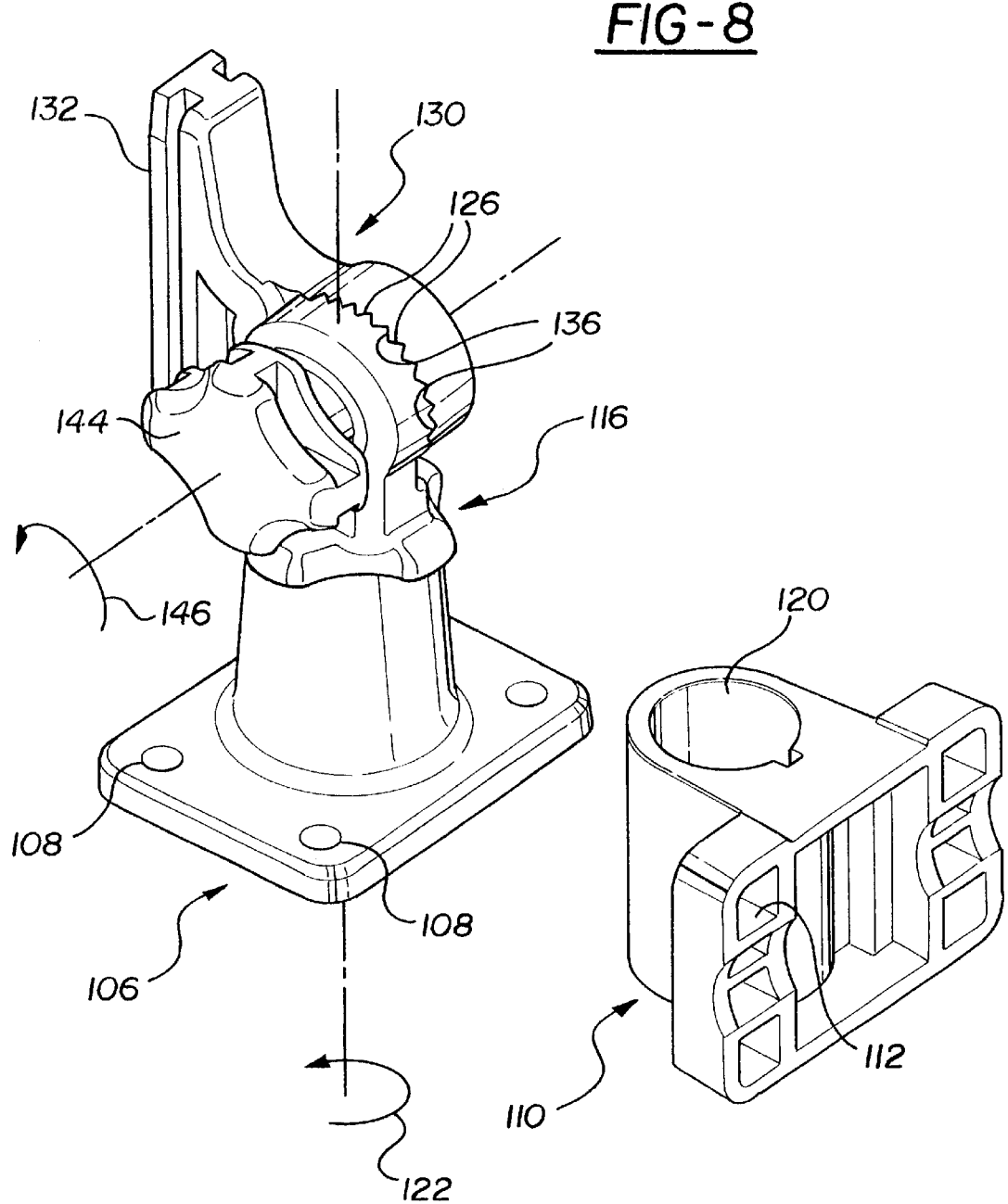
FIG. 8 is an assembled view of the mounting structure illustrated in FIG. 7 again for deck mounts to both horizontal and vertical surfaces.

Referring now to FIGS. 6–8, a holding device is illustrated at 104 according to a second preferred embodiment of the present invention. The holding device 104 is largely identical in construction to that described with reference to the holding device 10 of the first preferred embodiment, with the exception of the mounting assembly employed. Accordingly, identically presented features will be described according to the same reference numerals employed in the description of the first embodiment 10 and discussion of FIGS. 6–8 will be limited to the alternatively disclosed features of the mounting structure.

Specifically, a deck mount is provided for securing the elongate holding body to a substantially level surface. The deck mount may include, in a first variant, a horizontally mounted plate 106 having a plurality of apertures 108 for receiving mounting fasteners (not shown) for securing the plate 106 to a corresponding horizontal level surface, such as a level rail surface on a boat or the like. Alternatively, the deck mount may include, in a further variant of the second preferred embodiment, a vertically mounted plate 110 including a plurality of apertures 112 for receiving mounting fasteners (again not shown) for securing the plate 110 to a corresponding vertical level surface, such as a vertical side wall surface of a boat or marine support.

Regardless of the variant of the mounted plate 106 and 110 which is employed, repositioning structure is incorporated into the deck mount of the second preferred embodiment in order to facilitate repositioning of the hold device body about at least one, and preferably two, axis of rotation. According to the preferred embodiment, a first linkage member 114 is provided and includes a downwardly extending pedestal support 116 which is engageably received within an elongated receptacle (118 for horizontal mounted plate 106 and 120 for vertical mounted plate 110) and which is formed in the associated deck mount.

The pedestal support 116 is primarily constructed of a plurality of spaced apart and linearly extending bendable members and, upon seating within the selected associated receptacle 118 or 120, permits the linkage member 116 to be pivoted about a first axis 122 (see at FIG. 8) extending linearly along the direction of the pedestal support 116. The first linkage member 114 further terminates at an upper end in a first circular shaped head portion 124 which displays a first interengaging circular face upon which are formed a first annular array of serrated portions 126. A key-shaped aperture 128 extends through a central location of said first circular shaped head portion 124.

A second linkage member 130 having an elongate mounting portion 132 extending therefrom secures to a selected and exterior facing surface of the first semi-cylindrical shaped halve 22. As is best illustrated in FIG. 7, the elongate mounting portion 132 may be configured so that it can slidingly engage within a slot (not shown) or other suitable configuration defined within the body surface of the first halve 22. Alternatively, the second linkage member 130 with mounting portion 132 may be integrally secured and/or formed with the first elongate halve 22 without departing from the scope of the instant invention.

The second linkage member 130 further includes a second circular shaped head portion 134 which displays a second interengaging circular face upon which are formed a second annular array of serrated portions 136. A further key-shaped aperture 138 extends through a central location of said second circular shaped head portion 134. The first and second annular arrays of serrated portions 126 and 136 of the first and second circular linkage members 114 and 130 are aligned in opposing and engaged fashion and so that the first and second key-shaped apertures 128 and 138 are likewise in alignment.

A locking key 140 is provided having an elongate stem 142 and a knob 144 secured to one end thereof. The stem 142 of the key 140 is insertingly engaging through the first and second aligned and key-shaped apertures 128 and 138 of the first and second linkage members 114 and 130, respectively, and is turned in a selected direction to lock in place the opposing serrated faces of the linkage members. The knob 144 is then being rotated in a selected direction to tighten the first and second circular shaped head portions and opposingly facing serrated portions 126 and 136 of the linkage members to permit the second linkage member 130 and the elongate body which is secured thereto to pivot in a direction indicated at 146 about a second axis (see again FIG. 8) extending through a center line established with the first circular shaped head portion 124 of the first linkage member 114. The pivotal action about the second axis 146 is made possible by the rotary adjustment of the second linkage member, via its serrated edges 136 relative to the interengaging and serrated edges 126 of the first and fixed linkage member.

Figure 9:
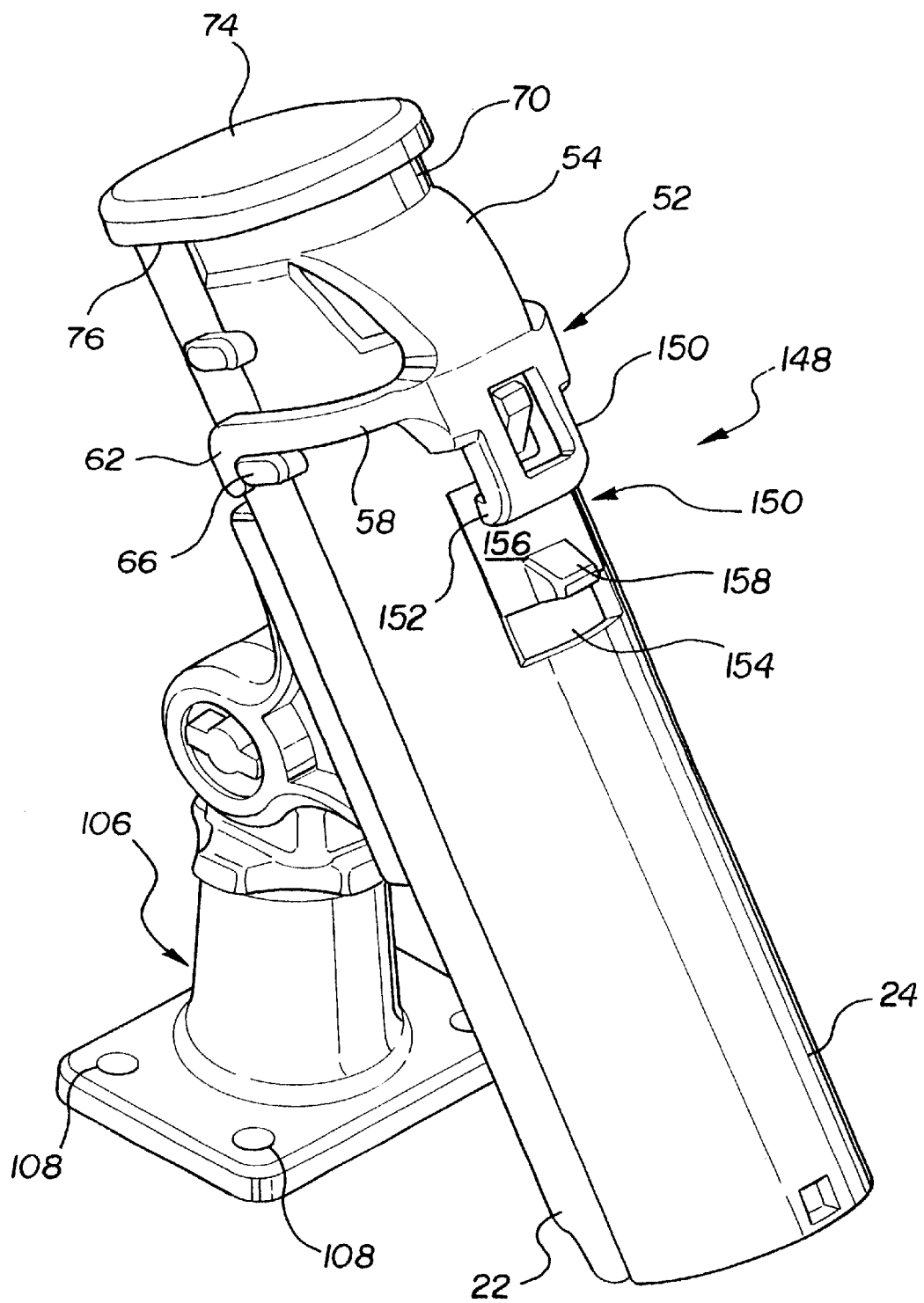
FIG. 9 is a view of a fishing rod holder according to a further variant which is similar to the embodiment illustrated in FIGS. 6–8 and further disclosing a safety switch forming a part of the mounting trigger and which prevents inadvertent disengagement of the semicylindrical halves upon the occurrence of the fishing pole "snapping backwards" in use.

Referring finally to FIG. 9, a yet further variant of the holding device is illustrated at 148. Although illustrated in use with a repositionable deck mount, it is understood that the inventive feature disclosed in FIG. 9, namely that of a safety switch assembly 150, may be equally applicable to the ground stake 78 embodiment of FIGS. 1–5, or with any other suitable mounting structure within the scope of the present invention.

Referring again to FIG. 9, the trigger assembly 52 further includes a finger 150 extending downwardly from the central portion 54 and which terminates at a downwardly and inwardly angled extension portion 152. The second semi-cylindrical shaped halve 24 further includes a slot 154 formed therethrough and which is positioned in proximity to the finger 150 and inwardly angled extension 152. A switch plate 156 of lesser dimension than the slot 154 is mounted within the slot 154 in a slidable manner. The switch plate 156 is translatable from a first location in which it abuts against the finger 150 and extension portion 152 to a second location in which it is slidably translated out of contact with the finger and extension portion. Movement of the switch plate 156 is facilitated by an engaging tab 158. The switch plate 156 further prevents pivotal engagement of the trigger assembly 52 when in the first location, which may otherwise occur if the fishing rod handle 14 accidentally snaps back and which would otherwise open the trigger assembly as illustrated in the earlier drawing figures by pressing against the annular collar 70.

Having described my invention, it will become apparent that it discloses a unique and novel fishing rod holding device which is not taught by the prior art. Additional preferred embodiments will become apparent to those skilled in the art to which it pertains and without deviating from the scope of the appended claims.

I claim:

1. A holding device for use with a conventional fishing rod, the fishing rod including an elongate handle, said holding device comprising:

an elongate body constructed from a first semi-cylindrical shaped halve and a second semi-cylindrical shaped halve, each of said first and second halves further including an open top end and a closed bottom end and defining, upon aligning said first and second halves in opposing and interengaging fashion, an elongate and interiorly extending passage for receiving in inserting manner the fishing rod handle, said first and second halves being pivotally connected to each other along said bottom ends;

a trigger pivotally secured to said second semi-cylindrical shaped halve, said trigger terminating in at least one latch mechanism for releasably interengaging said first semi-cylindrical halve together with said second semi-cylindrical halve in a first closed position, said trigger and latch mechanism disengaging said first semi-cylindrical half from said second semi-cylindrical half upon being pivoted to a second open position and revealing the inserted end of the fishing rod handle;

said trigger being pivotally secured to said second semi-cylindrical shaped halve in a position proximate said open top end, said trigger further comprising first and second oppositely extending and arcuate shaped latch arms, each of said latch arms terminating in a downwardly angled tab, said first semi-cylindrical shaped halve further including first and second outwardly extending ledges arrayed in abuttingly engaging alignment with said downwardly angled tabs upon said trigger being pivotally actuated to said closed position; and a mounting assembly upon which said body is secured, said mounting assembly fixedly securing said holding device to a desired location.

2. The fishing rod holding device as described in claim 1, said trigger further comprising a central portion from which said first and second arcuate latch arms extend, an annular and semi-circular shaped collar extending from an upper end of said central portion and seatingly aligning with a corresponding upper annular edge of said second semi-cylindrical portion upon said trigger being pivoted to said closed position.

3. The fishing rod holder as described in claim 1, said mounting assembly further comprising an elongate ground stake having a first mounting end and a second turf engaging and spike shaped end, twist-fit engaging means being provided between said mounting end of said ground stake and said body.

4. The fishing rod holder as described in claim 3, said twist-fit engaging means further comprising:

a first arcuate and semi-circular shaped ledge projection extending from a top edge surface of said first mounting end of said ground stake;

a second arcuate and semi-circular shaped ledge projection extending from said first mounting end a downwardly spaced distance from said first ledge projection and in a direction opposite said first ledge projection;

said first semi-cylindrical shaped body halve of said holding device further having defined, upon an inner and correspondingly semi-cylindrical shaped surface of said halve, a projecting shoulder, said shoulder including first and second enlarged projections which are separated by a semicircular and reduced projection, said shoulder further defining upper and lower edge surfaces which are substantially spaced apart and equal to the distance established between the first and second ledge projections of the ground stake, an aperture being formed through said closed bottom end of said first semi-cylindrical shaped halve for insertion of said mounting end of said ground stake; and upon said mounting end of said ground stake being inserted within said aperture, said stake being rotated so that said first arcuate ledge projection engages upon an upper edge surface of a first selected enlarged shoulder projection, said second arcuate ledge projection engaging upon a lower edge surface of a second selected enlarged shoulder projection.

5. The fishing rod holder as described in claim 1, said mounting assembly further comprising a deck mount for securing said elongate body to a substantially level surface, said deck mount further comprising repositioning means for permitting readjustment of said holding device body about at least one axis of rotation.

6. The fishing rod holder as described in claim 5, said deck mount further comprising a horizontally mounted plate including a plurality of apertures for receiving mounting fasteners for securing said plate to a corresponding horizontal level surface.

7. The fishing rod holder as described in claim 5, said deck mount further comprising a vertically mounted plate including a plurality of apertures for receiving mounting fasteners for securing said plate to a corresponding vertical level surface.

8. The fishing rod holder as described in claim 5, said repositioning means further comprising:

a first linkage member having a downwardly extending pedestal support which is engageably received within a receptacle formed in said deck mount, said pedestal support permitting said linkage member to be pivoted about a first axis extending linearly along said pedestal support, said first linkage member further terminating at an upper end in a first circular shaped head portion which displays a first interengaging circular face upon which are formed a first annular array of serrated portions, a key-shaped aperture extending through a central location of said first circular shaped head portion;

a second linkage member having an elongate mounting portion extending therefrom and which secures to an exterior facing surface of said first semi-cylindrical shaped halve, said second linkage member further including a second circular shaped head portion which displays a second interengaging circular face upon which are formed a second annular array of serrated portions, a further key-shaped aperture extending through a central location of said second circular shaped head portion, said first and second annular arrays of serrated portions of said first and second circular linkage members being aligned in opposing and engaged fashion and so that said first and second key-shaped apertures are in alignment; and a locking key having an elongate stem and a knob secured to one end thereof, said stem insertingly engaging through said first and second aligned key-shaped apertures, said knob being rotated in a selected direction to tighten said first and second circular shaped head portions of said linkage members and to permit said second linkage member and said elongate body to pivot about a second axis extending through a center line established with said first circular shaped head portion of said first linkage member.

9. The fishing rod holder as described in claim 1, said trigger further comprising a finger extending downwardly from said central portion, said second semi-cylindrical shaped halve further including a slot formed therethrough and which is positioned in proximity to said finger, a switch plate of lesser dimension than said slot and which is mounted within said slot, said switch plate being translatable from a first location in which it abuts against said finger portion to a second location in which it is slidably translated out of contact with said finger portion, said switch plate preventing pivotal engagement of said trigger when in said first location.

10. The fishing rod holder as described in claim 1, further comprising an end cap which is biasingly affixed over said first and second open top ends of said elongate body in said first closed position.

11. The fishing rod holder as described in claim 1, further comprising a first pair of mating and elongate extending recesses extending axially and along opposite and mating sides of said first halve, a second pair of mating and elongate extending projections extending in a likewise axially extending direction along opposite and mating sides of said second halve.

12. A holding device for use with a conventional fishing rod, the fishing rod including an elongate handle, a bendable shaft and a reel secured to the handle, the reel issuing a fishing line which extends in proximity along the shaft and beyond a remote end of the shaft, the fishing line terminating in a fish baiting portion, said holding device comprising:
an elongate body constructed from a first elongate and polygonal cross sectional shaped halve and a second elongate and likewise polygonal cross sectional shaped halve, each of said first and second halves further including an open top end and a bottom end and defining, upon aligning said first and second halves in opposing and interengaging fashion, an elongate and interiorly extending passage for receiving in inserting manner the fishing rod handle, said first and second halves being pivotally connected to each other along said bottom ends;
a trigger pivotally secured to said second semi-cylindrical shaped halve in a position proximate said open top end, said trigger further comprising first and second oppositely extending and arcuate shaped latch arms which extend around said second body halve and terminate in downwardly angled tabs proximate to said first semi-cylindrical shaped halve, said first body halve further including first and second outwardly extending ledges arrayed in abuttingly engaging alignment with said downwardly angled tabs upon said trigger being pivotally actuated in a selected direction for releasably interengaging said first semi-cylindrical halve together with said second semi-cylindrical halve, said trigger disengaging said first semi-cylindrical half from said second semi-cylindrical half upon being pivoted to a further selected and opposite direction and revealing the inserted end of the fishing rod handle; and
a mounting assembly upon which said body is secured, said mounting assembly fixedly securing said holding device to a desired location.

13. The fishing rod holder as described in claim 12, said mounting assembly further comprising an elongate ground stake having a first mounting end and a second turf engaging and spike shaped end, twist-fit engaging means being provided between said mounting end of ground stake and said body.

14. The fishing rod holder as described in claim 13, said twist-fit engaging means further comprising:
a first arcuate and semi-circular shaped ledge projection extending from a top edge surface of said first mounting end of said ground stake;
a second arcuate and semi-circular shaped ledge projection extending from said first mounting end a downwardly spaced distance from said first ledge projection and in a direction opposite said first ledge projection;
said first semi-cylindrical shaped body halve of said holding device further having defined, upon an inner and correspondingly semi-cylindrical shaped surface of said halve, a projecting shoulder, said shoulder including first and second enlarged projections which are separated by a semicircular and reduced projection, said shoulder further defining upper and lower edge surfaces which are substantially spaced apart equal to the distance established between the first and second ledge projections of the ground stake, an aperture being formed through said closed bottom end of said first semi-cylindrical shaped halve for insertion of said mounting end of said ground stake; and
upon said mounting end of said ground stake being inserted within said aperture, said stake being rotated so that said first arcuate ledge projection engages upon an upper edge surface of a first selected enlarged shoulder portion, said second arcuate ledge projection engaging upon a lower edge surface of a second selected enlarged shoulder portion.

15. A holding device for use with a conventional fishing rod, the fishing rod including an elongate handle, said holding device comprising:
an elongate body constructed from a first semi-cylindrical shaped halve and a second semi-cylindrical shaped halve, each of said first and second halves further including an open top end and a closed bottom end and defining, upon aligning said first and second halves in opposing and interengaging fashion, an elongate and interiorly extending passage for receiving in inserting manner the fishing rod handle, said first and second halves being pivotally connected to each other along said bottom ends;
a trigger pivotally secured to said second semi-cylindrical shaped halve, said trigger terminating in at least one latch mechanism for releasably interengaging said first semi-cylindrical halve together with said second semi-cylindrical halve in a first closed position, said trigger and latch mechanism disengaging said first semi-cylindrical half from said second semi-cylindrical half upon being pivoted to a second open position and revealing the inserted end of the fishing rod handle;
a mounting assembly upon which said body is secured, said mounting assembly fixedly securing said holding device to a desired location, said mounting assembly further comprising an elongate ground stake having a first mounting end and a second turf engaging and spike shaped end, twist-fit engaging means being provided between said mounting end of said ground stake and said body, said twist-fit engaging means further comprising:
a first arcuate and semi-circular shaped ledge projection extending from a top edge surface of said first mounting end of said ground stake;
a second arcuate and semi-circular shaped ledge projection extending from said first mounting end a downwardly spaced distance from said first ledge projection and in a direction opposite said first ledge projection;

said first semi-cylindrical shaped body halve of said holding device further having defined, upon an inner and correspondingly semi-cylindrical shaped surface of said halve, a projecting shoulder, said shoulder including first and second enlarged projections which are separated by a semicircular and reduced projection, said shoulder further defining upper and lower edge surfaces which are substantially spaced apart and equal to the distance established between the first and second ledge projections of the ground stake, an aperture being formed through said closed bottom end of said first semi-cylindrical shaped halve for insertion of said mounting end of said ground stake; and upon said mounting end of said ground stake being inserted within said aperture, said stake being rotated so that said first arcuate ledge projection engages upon an upper edge surface of a first selected enlarged shoulder projection, said second arcuate ledge projection engaging upon a lower edge surface of a second selected enlarged shoulder projection.

16. A holding device for use with a conventional fishing rod, the fishing rod including an elongate handle, said holding device comprising:

an elongate body constructed from a first semi-cylindrical shaped halve and a second semi-cylindrical shaped halve, each of said first and second halves further including an open top end and a closed bottom end and defining, upon aligning said first and second halves in opposing and interengaging fashion, an elongate and interiorly extending passage for receiving in inserting manner the fishing rod handle, said first and second halves being pivotally connected to each other along said bottom ends;

a trigger pivotally secured to said second semi-cylindrical shaped halve, said trigger terminating in at least one latch mechanism for releasably interengaging said first semi-cylindrical halve together with said second semi-cylindrical halve in a first closed position, said trigger and latch mechanism disengaging said first semi-cylindrical half from said second semi-cylindrical half upon being pivoted to a second open position and revealing the inserted end of the fishing rod handle;

a mounting assembly upon which said body is secured, said mounting assembly fixedly securing said holding device to a desired location, said mounting assembly further comprising a deck mount for securing said elongate body to a substantially level surface, said deck mount further comprising repositioning means for permitting readjustment of said holding device body about at least one axis of rotation, said repositioning means further comprising:

a first linkage member having a downwardly extending pedestal support which is engageably received within a receptacle formed in said deck mount, said pedestal support permitting said linkage member to be pivoted about a first axis extending linearly along said pedestal support, said first linkage member further terminating at an upper end in a first circular shaped head portion which displays a first interengaging circular face upon which are formed a first annular array of serrated portions, a key-shaped aperture extending through a central location of said first circular shaped head portion;

a second linkage member having an elongate mounting portion extending therefrom and which secures to an exterior facing surface of said first semi-cylindrical shaped halve, said second linkage member further including a second circular shaped head portion which displays a second interengaging circular face upon which are formed a second annular array of serrated portions, a further key-shaped aperture extending through a central location of said second circular shaped head portion, said first and second annular arrays of serrated portions of said first and second circular linkage members being aligned in opposing and engaged fashion and so that said first and second key-shaped apertures are in alignment; and a locking key having an elongate stem and a knob secured to one end thereof, said stem insertingly engaging through said first and second aligned and key-shaped apertures, said knob being rotated in a selected direction to tighten said first and second circular shaped head portions of said linkage members and to permit said second linkage member and said elongate body to pivot about a second axis extending through a center line established with said first circular shaped head portion of said first linkage member.

17. A holding device for use with a conventional fishing rod, the fishing rod including an elongate handle, said holding device comprising:

an elongate body constructed from a first semi-cylindrical shaped halve and a second semi-cylindrical shaped halve, each of said first and second halves further including an open top end and a closed bottom end and defining, upon aligning said first and second halves in opposing and interengaging fashion, an elongate and interiorly extending passage for receiving in inserting manner the fishing rod handle, said first and second halves being pivotally connected to each other along said bottom ends;

a trigger pivotally secured to said second semi-cylindrical shaped halve, said trigger terminating in at least one latch mechanism for releasably interengaging said first semi-cylindrical halve together with said second semi-cylindrical halve in a first closed position, said trigger and latch mechanism disengaging said first semi-cylindrical half from said second semi-cylindrical half upon being pivoted to a second open position and revealing the inserted end of the fishing rod handle;

said trigger further comprising a finger extending downwardly from said central portion, said second semi-cylindrical shaped halve further including a slot formed therethrough and which is positioned in proximity to said finger, a switch plate of lesser dimension than said slot and which is mounted within said slot, said switch plate being translatable from a first location in which it abuts against said finger portion to a second location in which it is slidably translated out of contact with said finger portion, said switch plate preventing pivotal engagement of said trigger when in said first location; and a mounting assembly upon which said body is secured, said mounting assembly fixedly securing said holding device to a desired location.

18. A holding device for use with a conventional fishing rod, the fishing rod including an elongate handle, said holding device comprising:

an elongate body constructed from a first semi-cylindrical shaped halve and a second semi-cylindrical shaped halve, a first pair of mating and elongate extending recesses extending axially and along opposite and mating sides of said first halve, a second pair of mating and elongate extending projections extending in a likewise axially extending direction along opposite and mating sides of said second halve, each of said first and second halves further including an open top end and a closed bottom end and defining, upon aligning said first and second halves in opposing and interengaging fashion, an elongate and interiorly extending passage for receiving in inserting manner the fishing rod handle, said first and second halves being pivotally connected to each other along said bottom ends;

a trigger pivotally secured to said second semi-cylindrical shaped halve, said trigger terminating in at least one latch mechanism for releasably interengaging said first semi-cylindrical halve together with said second semi-cylindrical halve in a first closed position, said trigger and latch mechanism disengaging said first semi-cylindrical half from said second semi-cylindrical half upon being pivoted to a second open position and revealing the inserted end of the fishing rod handle; and a mounting assembly upon which said body is secured, said mounting assembly fixedly securing said holding device to a desired location.

\* \* \* \* \*